(12) United States Patent
Taubman

(10) Patent No.: US 8,184,070 B1
(45) Date of Patent: May 22, 2012

(54) METHOD AND SYSTEM FOR SELECTING A USER INTERFACE FOR A WEARABLE COMPUTING DEVICE

(75) Inventor: Gabriel Taubman, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/177,152

(22) Filed: Jul. 6, 2011

(51) Int. Cl.
*G09G 5/00* (2006.01)

(52) U.S. Cl. .................. 345/8; 345/7; 348/115

(58) Field of Classification Search .......... 345/156, 345/169, 1.1, 1.2, 1.3, 7, 8, 9
See application file for complete search history.

(56) References Cited

U.S. PATENT DOCUMENTS

| | | | |
|---|---|---|---|
| 6,127,990 A * | 10/2000 | Zwern ................ | 345/8 |
| 6,135,951 A | 10/2000 | Richardson et al. | |
| 6,323,807 B1 | 11/2001 | Golding et al. | |
| 6,611,789 B1 | 8/2003 | Darley | |
| 6,898,550 B1 | 5/2005 | Blackadar et al. | |
| 6,955,542 B2 | 10/2005 | Roncalez et al. | |
| 7,162,392 B2 | 1/2007 | Vock et al. | |
| 7,172,563 B2 | 2/2007 | Takiguchi et al. | |
| 7,561,966 B2 | 7/2009 | Nakamura et al. | |
| 7,623,987 B2 | 11/2009 | Vock et al. | |
| 7,685,433 B2 | 3/2010 | Mantyjarvi et al. | |
| 7,711,961 B2 | 5/2010 | Fujinuma et al. | |
| 7,872,636 B1 * | 1/2011 | Gopi et al. ............. | 345/158 |
| 2002/0105482 A1 * | 8/2002 | Lemelson et al. ........... | 345/7 |
| 2003/0046401 A1 | 3/2003 | Abbott et al. | |
| 2006/0097986 A1 * | 5/2006 | Mizuno ............... | 345/156 |
| 2007/0300185 A1 | 12/2007 | Macbeth et al. | |
| 2009/0055739 A1 | 2/2009 | Murillo et al. | |
| 2009/0241171 A1 | 9/2009 | Sunwoo et al. | |
| 2009/0290450 A1 | 11/2009 | Rioux | |
| 2010/0048256 A1 | 2/2010 | Huppi et al. | |
| 2010/0079356 A1 | 4/2010 | Hoellwarth | |
| 2011/0001699 A1 | 1/2011 | Jacobsen et al. | |
| 2011/0022357 A1 | 1/2011 | Vock et al. | |
| 2011/0112771 A1 | 5/2011 | French | |
| 2011/0227820 A1 | 9/2011 | Haddick et al. | |

FOREIGN PATENT DOCUMENTS

WO 2011003181 A1 1/2011

OTHER PUBLICATIONS

Gafurov et al., "Biometric Gait Authentication Using Accelerometer Sensor", Journal of Computers, vol. 1, No. 7, pp. 51-59, Oct./Nov. 2006.
Cakmakci, O., et al., "Head-Word Displays: A Review," Journal of Display Technology, vol. 2, pp. 199-216, 2006.
Buttussi et al., MOPET: A context-aware and user-adaptive wearable system for fitness training, Artificial Intelligence in Medicine, vol. 42, Issue 2, Wearable Computing and Artificial Intelligence for Healthcare Applications, Feb. 2008, pp. 153-163.

* cited by examiner

*Primary Examiner* — Duc Dinh
(74) *Attorney, Agent, or Firm* — McDonnell Boehnen Hulbert & Berghoff LLP

(57) ABSTRACT

Example methods and systems for selecting a user interface for a wearable computing device are disclosed. An accelerometer system may determine a user activity of a user wearing a wearable computing device. Based on the user activity determined by the accelerometer system, the wearable computing device may select a user interface for the wearable computing device such that the user interface is appropriate for the determined user activity.

42 Claims, 6 Drawing Sheets

METHOD AND SYSTEM FOR SELECTING A USER INTERFACE FOR A WEARABLE COMPUTING DEVICE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As computers become more advanced, augmented-reality devices, which blend computer-generated information with the user's perception of the physical world, are expected to become more prevalent.

SUMMARY

In one aspect, an example method involves: (i) an accelerometer system determining a user activity of a user wearing a wearable computing device; (ii) based on the user activity determined by the accelerometer system, selecting a user interface for the wearable computing device such that the user interface is appropriate for the determined user activity (iii) wherein, if the user activity comprises traveling upstairs, the selected user interface comprises a display where the display is, compared to a standard display, shifted towards a top of a display screen of the wearable computing device; and (iv) wherein, if the user activity comprises traveling downstairs, the selected user interface comprises a display where the display is, compared to a standard display, shifted towards a bottom of a display screen of the wearable computing device.

In an example embodiment, the determined user activity is selected from the group consisting of sitting, walking, running, traveling upstairs, and traveling downstairs. Further, the user interface may include at least one visual user-interface setting appropriate for the determined user activity and/or at least one audio user-interface setting appropriate for the determined user activity.

In another aspect, a non-transitory computer readable medium having instructions stored thereon that, in response to execution by a processor, cause the processor to perform operations is disclosed. According to an example embodiment, the instructions include: (i) instructions for determining a user activity of a user wearing a wearable computing device; and (ii) instructions for, based on the determined user activity, selecting a user interface for the wearable computing device such that the user interface is appropriate for the determined user activity; wherein, if the user activity comprises traveling upstairs, the selected user interface comprises a display where the display is, compared to a standard display, shifted towards a top of a display screen of the wearable computing device; and wherein, if the user activity comprises traveling downstairs, the selected user interface comprises a display where the display is, compared to a standard display, shifted towards a bottom of a display screen of the wearable computing device.

In yet another aspect, a wearable computing system is disclosed. An example wearable computing system includes: (i) a head-mounted display, wherein the head-mounted display is configured to display computer-generated information in accordance with a user interface and to allow visual perception of the physical world; (ii) an accelerometer system configured to determine a user activity of a user wearing the head-mounted display; and (iii) a controller, wherein the controller is configured to, based on the user activity determined by the accelerometer system, select the user interface for the head-mounted display such that the selected user interface is appropriate for the determined user activity; wherein, if the user activity comprises traveling upstairs, the selected user interface comprises a display where the display is, compared to a standard display, shifted towards a top of a display screen of the head mounted display; and wherein, if the user activity comprises traveling downstairs, the selected user interface comprises a display where the display is, compared to a standard display, shifted towards a bottom of a display screen of the head mounted display.

These as well as other aspects, advantages, and alternatives, will become apparent to those of ordinary skill in the art by reading the following detailed description, with reference where appropriate to the accompanying drawings.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

I. Overview

A wearable computing device may be configured to display computer-generated information in accordance with a user interface and to allow visual perception of the physical world. Advantageously, the computer-generated information may be integrated with a user's perception of the physical world. For example, the computer-generated information may supplement a user's perception of the physical world with useful computer-generated information related to what the user is perceiving or experiencing at a given moment.

A user may be engaged in a variety of activities while a user is wearing and using a wearable computing device. For instance, the user may be standing, sitting, walking, running, traveling upstairs, or traveling downstairs. A given user interface provided by the wearable computing device may be more appropriate for one type of user activity than another type of user activity. Thus, it may be beneficial for a wearable computing device to adjust the user interface in accordance with the activity of the user wearing the wearable computing device. For instance, the wearable computing device may be configured to provide different user interfaces when a user is standing, sitting, walking, running, traveling upstairs, or traveling downstairs.

The methods and systems described herein can facilitate the selection of a user interface for a wearable computing device such that the user interface is appropriate for the activity in which the user of the wearable computing device is engaged. An example method may involve: (i) an accelerometer system determining a user activity of a user wearing a wearable computing device; and (ii) based on the user activity determined by the accelerometer system, selecting a user interface for the wearable computing device such that the user interface is appropriate for the determined user activity.

In accordance with an example embodiment, the accelerometer system may detect changes in the user activity. Responsive to detecting a change in the activity of the user, the wearable computing device may select a new user interface based on the new user activity such that the new user interface is appropriate for the new user activity. In this way, the user interface of the wearable computing device may adapt to the various activities of the user of the wearable computing device.

II. Example Systems and Devices

Figure 1:
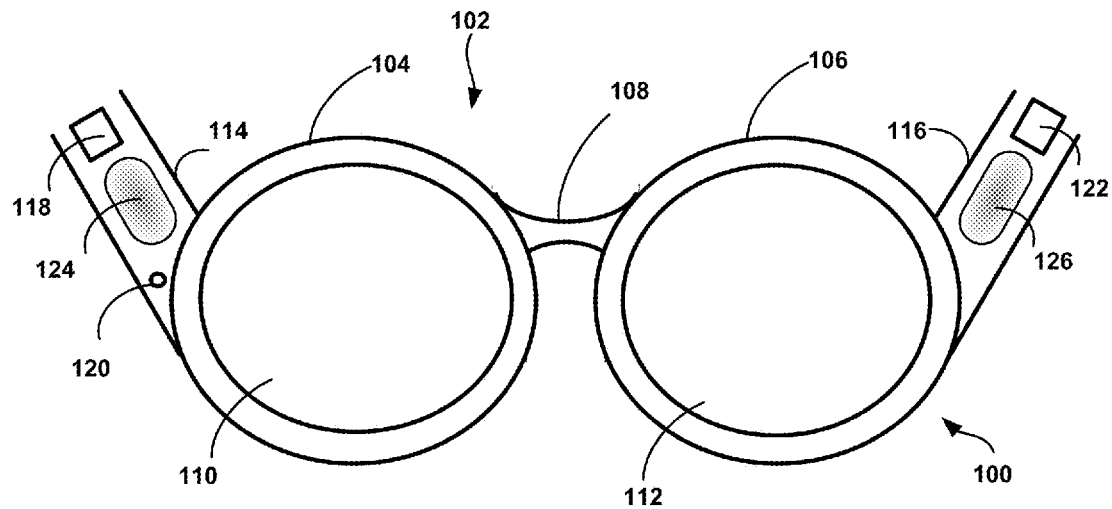
FIG. 1 is a first view of a wearable computing device for receiving, transmitting, and displaying data, in accordance with an example embodiment.

FIG. 1 illustrates an example system 100 for receiving, transmitting, and displaying data. The system 100 is shown in the form of a wearable computing device. While FIG. 1 illustrates eyeglasses 102 as an example of a wearable computing device, other types of wearable computing devices could additionally or alternatively be used. As illustrated in FIG. 1, the eyeglasses 102 comprise frame elements including lens-frames 104 and 106 and a center frame support 108, lens elements 110 and 112, and extending side-arms 114 and 116. The center frame support 108 and the extending side-arms 114 and 116 are configured to secure the eyeglasses 102 to a user's face via a user's nose and ears, respectively. Each of the frame elements 104, 106, and 108 and the extending side-arms 114 and 116 may be formed of a solid structure of plastic and/or metal, or may be formed of a hollow structure of similar material so as to allow wiring and component interconnects to be internally routed through the eyeglasses 102. Each of the lens elements 110 and 112 may be formed of any material that can suitably display a projected image or graphic. In addition, at least a portion of each of the lens elements 110 and 112 may also be sufficiently transparent to allow a user to see through the lens element. Combining these two features of the lens elements can facilitate an augmented reality or heads-up display where the projected image or graphic is superimposed over or provided in conjunction with a real-world view as perceived by the user through the lens elements.

The extending side-arms 114 and 116 are each projections that extend away from the frame elements 104 and 106, respectively, and can be positioned behind a user's ears to secure the eyeglasses 102 to the user. The extending side-arms 114 and 116 may further secure the eyeglasses 102 to the user by extending around a rear portion of the user's head. Additionally or alternatively, for example, the system 100 may connect to or be affixed within a head-mounted helmet structure. Other possibilities exist as well.

The system 100 may also include an on-board computing system 118, a video camera 120, a sensor 122, and finger-operable touch pads 124 and 126. The on-board computing system 118 is shown to be positioned on the extending side-arm 114 of the eyeglasses 102; however, the on-board computing system 118 may be provided on other parts of the eyeglasses 102 or even remote from the glasses (e.g., computing system 118 could be connected wirelessly or wired to eyeglasses 102). The on-board computing system 118 may include a processor and memory, for example. The on-board computing system 118 may be configured to receive and analyze data from the video camera 120, the finger-operable touch pads 124 and 126, the sensor 122 (and possibly from other sensory devices, user-interface elements, or both) and generate images for output to the lens elements 110 and 112.

The video camera 120 is shown positioned on the extending side-arm 114 of the eyeglasses 102; however, the video camera 120 may be provided on other parts of the eyeglasses 102. The video camera 120 may be configured to capture images at various resolutions or at different frame rates. Many video cameras with a small form-factor, such as those used in cell phones or webcams, for example, may be incorporated into an example of the system 100. Although FIG. 1 illustrates one video camera 120, more video cameras may be used, and each may be configured to capture the same view, or to capture different views. For example, the video camera 120 may be forward facing to capture at least a portion of the real-world view perceived by the user. This forward facing image captured by the video camera 120 may then be used to generate an augmented reality where computer-generated images appear to interact with the real-world view perceived by the user.

The sensor 122 is shown mounted on the extending side-arm 116 of the eyeglasses 102; however, the sensor 122 may be provided on other parts of the eyeglasses 102. The sensor 122 may include one or more of an accelerometer or a gyroscope, for example. Other sensing devices may be included within the sensor 122 or other sensing functions may be performed by the sensor 122.

The finger-operable touch pads 124 and 126 are shown mounted on the extending side-arms 114, 116 of the eyeglasses 102. Each of finger-operable touch pads 124 and 126 may be used by a user to input commands. The finger-operable touch pads 124 and 126 may sense at least one of a position and a movement of a finger via capacitive sensing, resistance sensing, or a surface acoustic wave process, among other possibilities. The finger-operable touch pads 124 and 126 may be capable of sensing finger movement in a direction parallel or planar to the pad surface, in a direction normal to the pad surface, or both, and may also be capable of sensing a level of pressure applied. The finger-operable touch pads 124 and 126 may be formed of one or more translucent or transparent insulating layers and one or more translucent or transparent conducting layers. Edges of the finger-operable touch pads 124 and 126 may be formed to have a raised, indented, or roughened surface, so as to provide tactile feedback to a user when the user's finger reaches the edge of the finger-operable touch pads 124 and 126. Each of the finger-operable touch pads 124 and 126 may be operated independently, and may provide a different function. Furthermore, system 100 may include a microphone configured to receive voice commands from the user. In addition, system 100 may include one or more communication interfaces that allow various types of external user-interface devices to be connected to the wearable computing device. For instance, system 100 may be configured for connectivity with various hand-held keyboards and/or pointing devices.

Figure 2:
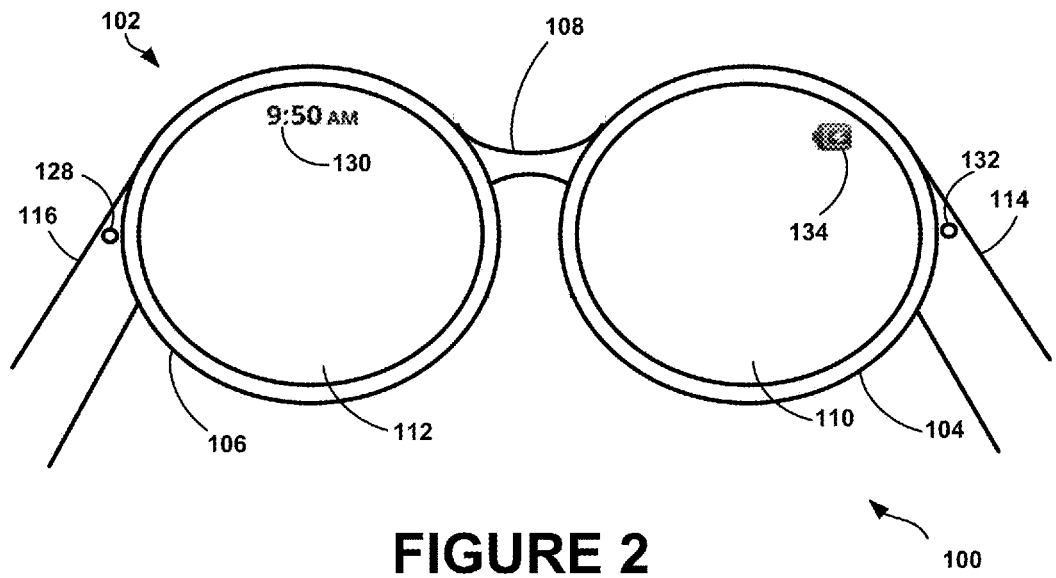
FIG. 2 is a second view of the wearable computing device of FIG. 1, in accordance with an example embodiment.

FIG. 2 illustrates an alternate view of the system 100 of FIG. 1. As shown in FIG. 2, the lens elements 110 and 112 may act as display elements. The eyeglasses 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110 and 112 may act as a combiner in a light-projection system and may include a coating that reflects the light projected onto them from the projectors 128 and 132. Alternatively, the projectors 128 and 132 could be scanning laser devices that interact directly with the user's retinas.

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in-focus near-to-eye image to the user. A corresponding display driver may be disposed within the frame elements 104 and 106 for driving such a matrix display. Alternatively or additionally, a laser or LED source and scanning system could be used to draw a raster display directly onto the retina of one or more of the user's eyes. Other possibilities exist as well.

Figure 3:
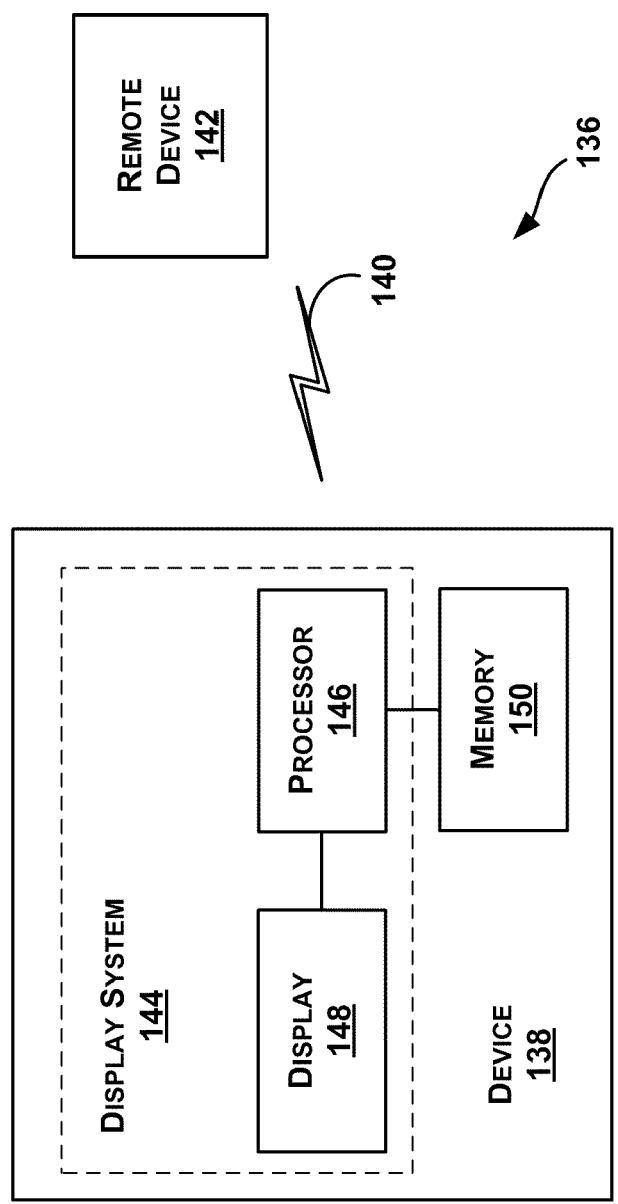
FIG. 3 is a simplified block diagram of a computer network infrastructure, in accordance with an example embodiment.

FIG. 3 illustrates an example schematic drawing of a computer network infrastructure. In one system 136, a device 138 communicates using a communication link 140 (e.g., a wired or wireless connection) to a remote device 142. The device 138 may be any type of device that can receive data and display information corresponding to or associated with the data. For example, the device 138 may be a heads-up display system, such as the eyeglasses 102 described with reference to FIGS. 1 and 2.

Thus, the device 138 may include a display system 144 comprising a processor 146 and a display 148. The display 148 may be, for example, an optical see-through display, an optical see-around display, or a video see-through display. The processor 146 may receive data from the remote device 142, and configure the data for display on the display 148. The processor 146 may be any type of processor, such as a microprocessor or a digital signal processor, for example.

The device 138 may further include on-board data storage, such as memory 150 coupled to the processor 146. The memory 150 may store software that can be accessed and executed by the processor 146, for example.

The remote device 142 may be any type of computing device or transmitter including a laptop computer, a mobile telephone, etc., that is configured to transmit data to the device 138. The remote device 142 could also be a server or a system of servers. The remote device 142 and the device 138 may contain hardware to enable the communication link 140, such as processors, transmitters, receivers, antennas, etc. In another example, the remote device 142 could be a remote accelerometer mounted on the user separate from the head-mounted display of the wearable computing system.

In FIG. 3, the communication link 140 is illustrated as a wireless connection; however, wired connections may also be used. For example, the communication link 140 may be a wired link via a serial bus such as a universal serial bus or a parallel bus. A wired connection may be a proprietary connection as well. The communication link 140 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 142 may be accessible via the Internet and may comprise a computing cluster associated with a particular web service (e.g., social-networking, photo sharing, address book, etc.).

III. Exemplary Methods

Figure 4:
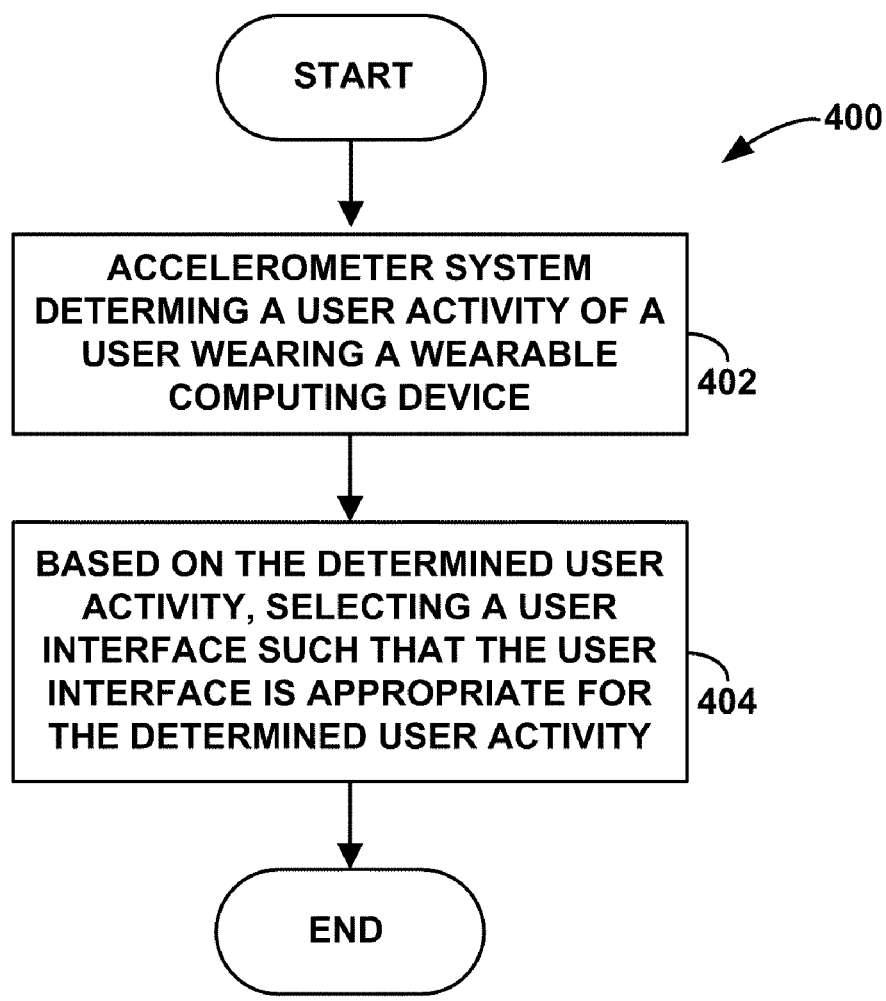
FIG. 4 is a flow chart illustrating a method according to an example embodiment.

Exemplary methods may involve a wearable computing device, such as system 100, determining what type of user activity a user of the wearable computing device is engaged in, and responsively selecting a user interface for the wearable computing device that is appropriate for the determined user activity. FIG. 4 is a flow chart illustrating a method according to an example embodiment. More specifically, example method 400 involves an accelerometer system determining a user activity of a user wearing a wearable computing device, as shown by block 402. The wearable computing device then selects, based on the user activity determined by the accelerometer system, a user interface for the wearable computing device such that the user interface is appropriate for the determined user activity, as shown by block 404. Although the exemplary method 400 is described by way of example as being carried out by the wearable computing device 100, it should be understood that an example method may be carried out by a wearable computing device in combination with one or more other entities, such as a remote accelerometer and/or one or more servers.

A. Determining a User Activity of a User Wearing the Wearable Computing Device

As mentioned above, at block 402 the accelerometer system may determine a user activity of a user wearing a wearable computing device. With reference to FIG. 1, the accelerometer system may comprise, for example, sensor 122 and on-board computing system 118. In order to determine the user activity, the accelerometer system may collect acceleration data from the accelerometer 122. Any suitable accelerometer now known in the art or later developed could be used in the accelerometer system. In an example, a single axis (e.g., up-down axis) accelerometer could be used. However, in another example, a multi-axis accelerometer could be used. In addition, the accelerometer system could include additional movement or motion detection components, such as a gyroscope and/or a compass. Such additional components may provide additional movement or motion data for the accelerometer system to use in order to determine the user activity of the user of the wearable computing device. Other movement-detection devices may be included in the accelerometer system as well.

Based on the accelerometer data, the accelerometer system may determine the activity in which a user of the wearable computing device is engaged. For example, the accelerometer system may determine whether the user is sitting, walking, running, traveling upstairs, and traveling downstairs. It should be understood that determining other types of user activities is possible as well. Each user activity may have a different acceleration pattern associated with the activity. For instance, sitting has a first acceleration pattern, walking has a second acceleration pattern, running has a third acceleration pattern, traveling upstairs has a fourth acceleration pattern, and traveling downstairs has a fifth acceleration pattern. In addition, the acceleration patterns for various activities may be unique to individual users.

The on-board computing system 118 may analyze the data collected by accelerometer 122 to determine the activity in which the user is engaged. In general, the on-board computing system 118 may determine which activity the collected data most closely matches, and then the on-board computing system 118 may treat the most closely matched activity as the activity in which the user is engaged. In order to determine the most closely matched activity, the on-board computing system 118 may perform calculations suitable for pattern-recognition problems. For instance, the on-board computing system 118 may utilize a nearest-neighbor-model algorithm or a hidden-Markov-model (HMM) algorithm in order to determine the most closely matched activity. Other algorithms are possible as well.

As mentioned above, in the example according to FIG. 1, the accelerometer system is part of the wearable computing device. However, in another example embodiment, the accelerometer system may be mounted on the user separate from the wearable computing device. For instance, the accelerometer system may be mounted on a user's arm, hip, leg, or foot. In such a case, the accelerometer system could be configured to communicate (e.g., wirelessly) the accelerometer data to the wearable computing device. In another example, different components of the accelerometer system may be located at different locations. For instance, the accelerometer may be located on a user's arm, hip, leg, ankle, or foot, while the computing system of the accelerometer system may be located on the wearable computing device. As another example, the accelerometer system may include a plurality of accelerometers, where each accelerometer is located on a different part of the user's body.

It should be understood that acceleration data may be different for the same activities depending on where the accelerometer system is mounted. Thus, the acceleration patterns associated with a given user activity may differ depending on where the accelerometer is located, and the computing system that analyzes the accelerometer data can take the location of the accelerometer into account when determining the user activity in which the user is engaged.

As a particular example, the acceleration data recorded for various activities will be different for an accelerometer mounted on a user's ankle than for an accelerometer located on the user's head (e.g., an accelerometer in the wearable computing device). For instance, when a user is walking, an accelerometer on a user's ankle would likely move forward and up (and then forward and down) with each step. Further, as a user is taking a step with the other foot, the accelerometer would remain somewhat stationary. However, when a user is walking, an accelerometer on a user's head would generally move forward, while perhaps oscillating up and down slightly with each step of the user. Therefore, the accelerometer data recorded by each of these accelerometers would differ when a user is walking.

As another example, when a user is standing, an accelerometer on a user's ankle would likely remain somewhat stationary, while occasionally shifting location slightly if the user shifts the user's stance. However, when a user is standing, a user may typically sway their head slightly or turn their head, and thus an accelerometer on a user's head may move in accordance with how the user sways or turns their head. As yet another example, when a user is sitting, an accelerometer on a user's ankle may move in accordance with how a user shifts their ankle when sitting (e.g., a user may cross their legs, tap their toes, etc.) However, when a user is sitting, a user may typically sway their head slightly or turn their head, and thus an accelerometer on a user's head may move in accordance with how the user sways or turns their head.

As still yet another example, when a user is traveling upstairs, an accelerometer on a user's ankle would likely move forward and up with each step. Further, as a user is taking a step with the other foot, the accelerometer would remain somewhat stationary. However, an accelerometer on a user's head would generally move both forward and up. As still yet another example, when a user is traveling downstairs, an accelerometer on a user's ankle would likely move forward and down with each step. Further, as a user is taking a step with the other foot, the accelerometer would remain somewhat stationary. However, an accelerometer on a user's head would generally move both forward and down.

It should be understood that above descriptions of these different accelerometer movements for the different user activities are intended as examples only. Each user (and each user's body parts) may move differently depending on the user activity. The accelerometer system may be configured to recognize the movement patterns of each particular user, and to determine the activity each user is engaged in based on the recorded acceleration data.

B. Selecting a User Interface for the Wearable Computing Device Such that the User Interface is Appropriate for the Determined User Activity As mentioned above, at block 404, the wearable computing device 100 may select, based on the user activity determined by the accelerometer system, a user interface for the wearable computing device such that the user interface is appropriate for the determined user activity. In an example, a controller of the wearable computing device, such as on-board computing system 118, may make this user-interface selection.

The user interface may include how the user perceives the computer-generated information and/or how the user is able to interact with the wearable computing device. For example, a given user interface may be appropriate for a first activity while being inappropriate (or less appropriate) for a second user activity. For example, the user interface may include visual user-interface settings, and some settings may be appropriate for a given activity but not appropriate (or less appropriate) for another activity. As another example, the user interface may include audio user-interface settings, and some audio settings may be appropriate for a given activity but not appropriate (or less appropriate) for another activity.

Figure 5A:
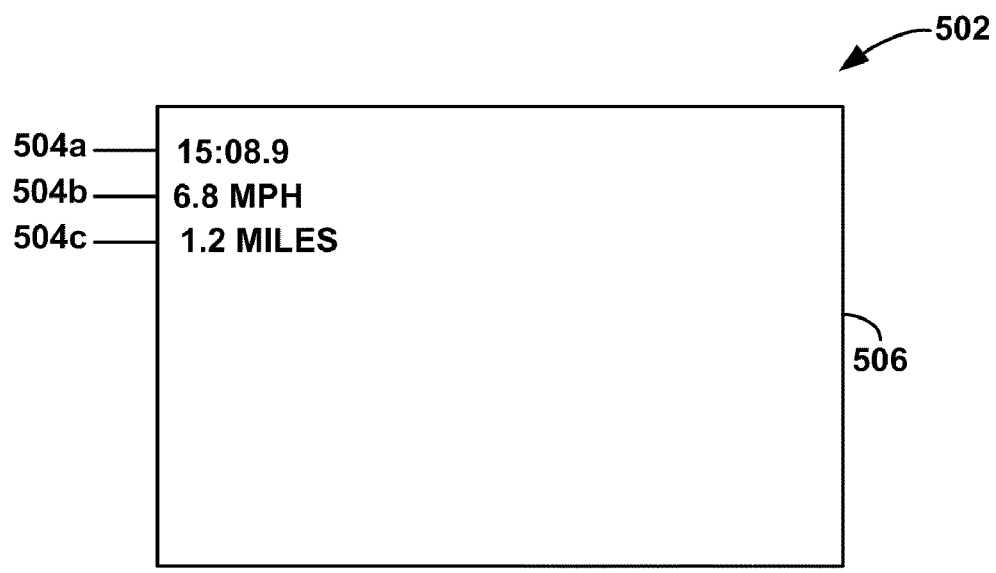
FIG. 5a is an illustration of a user interface according to an example embodiment.
Figure 5B:
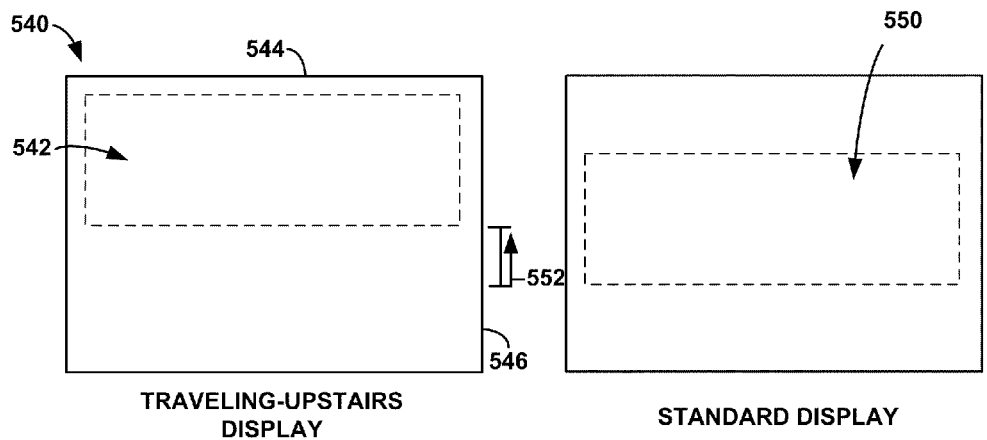
FIG. 5b is an illustration of a user interface according to another example embodiment.
Figure 5C:
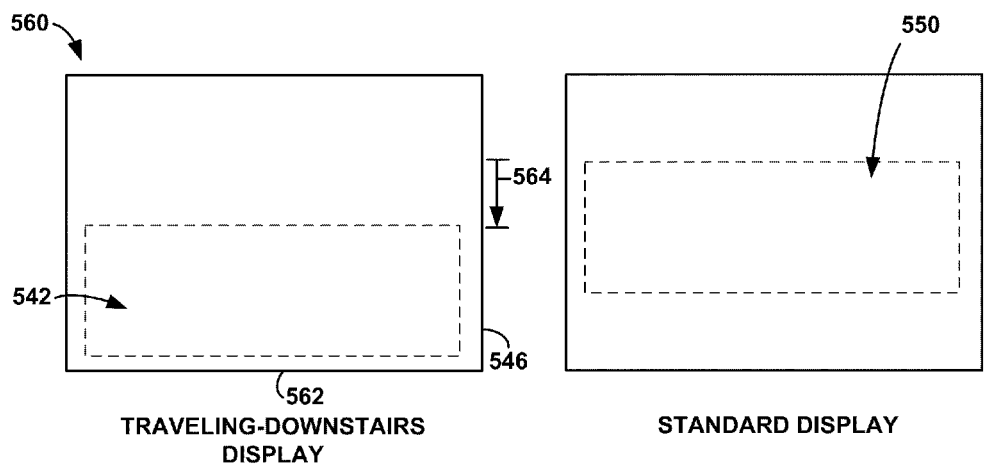
FIG. 5c is an illustration of a user interface according to yet another example embodiment.

Example user interfaces appropriate for different user activities are shown in FIGS. 5*a-c*. In particular, FIG. 5*a* depicts an example user interface that is appropriate for running, FIG. 5*b* depicts an example user interface that is appropriate for traveling upstairs, and FIG. 5*c* depicts an example user interface that is appropriate for traveling downstairs. It should be understood that these example user interfaces are illustrative examples, and other example user interfaces appropriate for various user activities are possible as well.

In addition, these example user interfaces may differ in various ways from a standard user interface for the wearable computing device. In an example, a standard user interface may be a user interface that is appropriate for when a user is standing. For instance, when a user is standing, the user may be capable of processing a standard amount of computer-generated information. When a user is standing, the user may typically be looking forward. Thus, in a standard user interface, the display of the computer-generated information may be confined to a certain portion of the display screen of the wearable computing device such that the computer-generated information is in the user's main line of sight. As an example, FIGS. 5*b* and 5*c* depict a standard user-interface display screen 550 where the display screen 550 is in the user's main line of sight, as opposed to the periphery of the user's sight. In addition, a standard user interface may include a display that has an appropriate visual density of computer-generated information. The wearable computing device 100 may make changes from the standard user interface in accordance with the activity in which the user is engaged. In particular, changes can be made to the standard user interface in order to make the user interface more appropriate for the given user activity.

With reference to FIG. 5a, an example user interface 502 appropriate for running is described. User interface 502 comprises a display 506 that includes running-related statistics of the user. Statistics 504a-c are example running statistics that could be displayed in user interface 502. In particular, statistic 504a shows the time elapsed since the user began running, statistic 504b shows the user's pace (e.g., MPH), and statistic 504c shows the user's remaining distance. In order to determine the user's remaining distance, the user could instruct the wearable computing device regarding the distance the user plans to run. Alternatively, the wearable computing device could have a preset distance goal for when the wearable computing device detects that the user is running (e.g., a preset distance goal of three miles).

In addition, the user interface 502 comprises a display 506 with a visual density that is appropriate for running. In an example, the visual density that is appropriate for running comprises a visual density that is less dense that a visual density that is appropriate for walking, sitting, or standing. That is, the computer-generated information shown in display 504 is not as dense as computer-generated information shown in a display that is appropriate for walking, sitting, or standing. For instance, the display appropriate for running may have less computer-generated information shown in the display.

A less dense visual density for a user that is running as opposed to walking or sitting may be beneficial for the user of the wearable computing device. For instance, the less dense visual density would likely lead to fewer interruptions and distractions to the user's perception of the visual world. Fewer interruptions and distractions may help to prevent distraction to the user while the user is running, which may limit or prevent injuries to the user as the user is running.

In addition, a user interface that is appropriate for running may comprise a visual display that is less dense visually in the main line of sight of the user than in a visual display appropriate for walking, standing, or sitting. For instance, in the example of FIG. 5a, the running related statistics 504a-c are located in the periphery of the display 506, which would also be in the periphery of the user's field of vision. Thus, a user can concentrate primarily on the physical world as the user is running, and the user's primary field of vision is not interrupted by the computer-generated information.

In another example, a user interface that is suitable for running may include an audio user-interface setting that is appropriate for running. For instance, the setting may be that the wearable computing device automatically plays music that is correlated with the running pace of the user.

With reference to FIG. 5b, a user interface 540 that is appropriate for a user traveling upstairs is shown. In particular, the user interface 540 comprises a display 542 where the display is, compared to a standard display (such as the user interface display 550), shifted towards a top 544 of a display screen 546 of the wearable computing device. As such, the display 542 of the computer-generated information will beneficially be more in line with the user's line of sight, since the user is likely looking up as a user is traveling upstairs. In a standard user interface, the computer-generated information may be displayed in the display area 550, which may be in the user's main line of sight. Areas outside the display area may be in the user's peripheral vision. Beneficially, by shifting the display towards the top of the display screen when a user is traveling upstairs, the computer-generated information remains in the user's main line of sight. This example user-interface may also be appropriate for a user traveling (e.g., walking or running) uphill. Further, this example user-interface may also be appropriate for a user that is elevating in any manner at an angle. For instance, the user may be elevating at an angle between 10 degrees and 80 degrees; however, other angles are possible as well.

In the example of FIG. 5b, when an accelerometer system detects that a user is traveling upstairs, the wearable computing device may shift the entire display up a given amount, such as the amount indicated by arrow 552. In an alternative embodiment, the wearable computing device could shift some of the computer-generated information towards the top 544 of the display screen, so that the computer-generated information is more in line with the user's line of sight.

With reference to FIG. 5c, a user interface 560 that is appropriate for a user traveling downstairs is shown. In particular, the user interface 560 comprises display 542 where the display is, compared to a standard display (such as the user interface display 550), shifted towards a bottom 562 of a display screen 546 of the wearable computing device. As such, the display 542 of the computer-generated information will beneficially be more in line with the user's line of sight, since the user is likely looking down as a user is traveling downstairs. This example user-interface may also be appropriate for a user traveling (e.g., walking or running) downhill. Further, this example user-interface may also be appropriate for a user that is descending in any manner at an angle. For instance, the user may be descending at an angle between 10 degrees and 80 degrees; however, other angles are possible as well.

Similar to the example of FIG. 5b, when an accelerometer system detects that a user is traveling downstairs, the wearable computing device may shift the entire display down a given amount, such as the amount indicated by arrow 564. In an alternative embodiment, the wearable computing device could shift some of the computer-generated information towards the bottom 562 of the display screen, so that the computer-generated information is more in line with the user's line of sight.

As mentioned above, the wearable computing device can adjust the user interface as the user's activity changes. In accordance with an example embodiment, the accelerometer system may detect a change in the user activity of the user from the determined user activity to a second user activity different from the determined user activity. Responsive to detecting the change in the user activity of the user, the wearable computing device may select a second user interface based on the second user activity such that the second user interface is appropriate for the second user activity. For instance, if the system detects that a user is no longer traveling upstairs, the wearable computing device may adjust the visual display to a standard display. Other examples are possible as well.

C. User-Interface Profile

Figure 6:
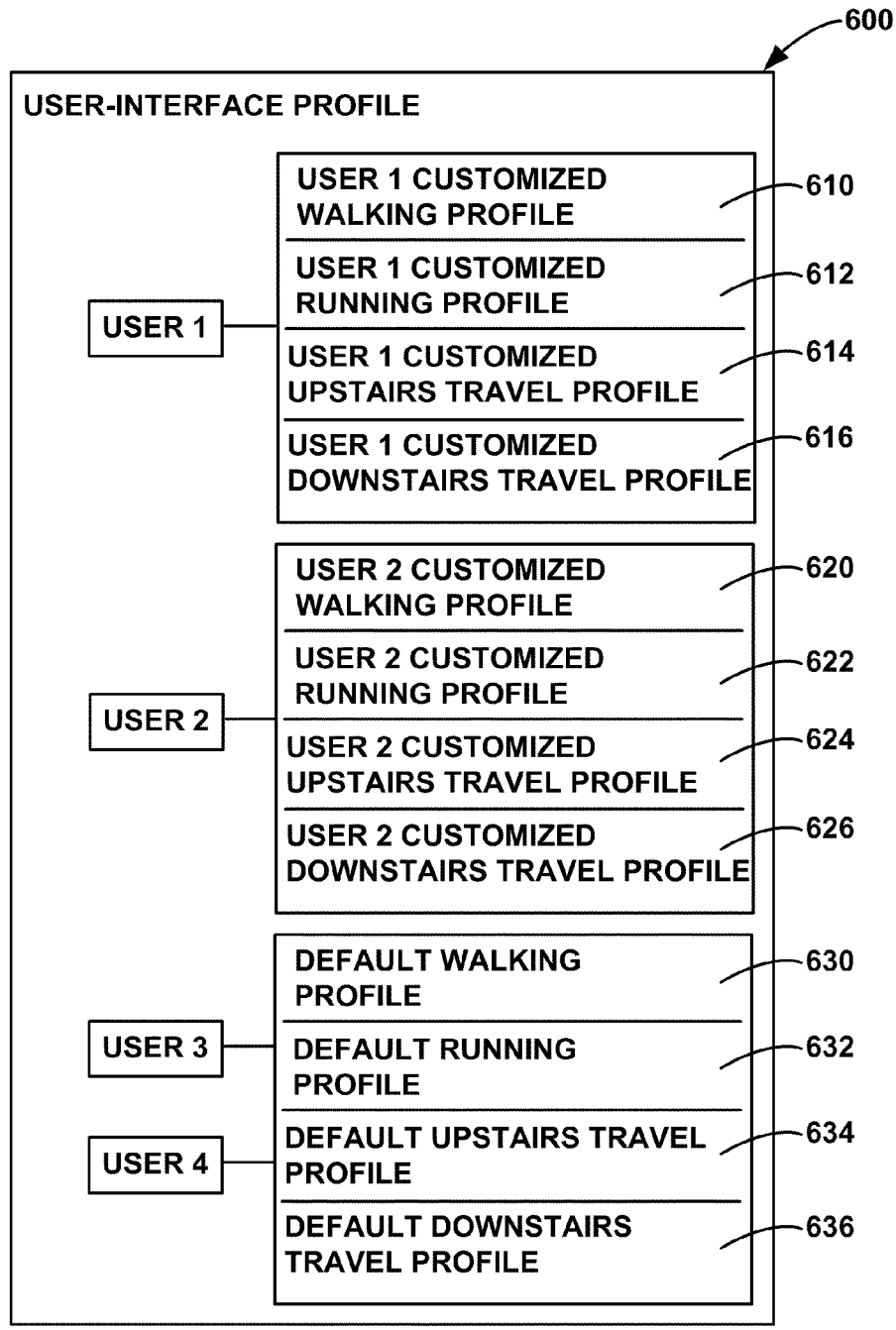
FIG. 6 is a schematic diagram of a user-interface profile according to an example embodiment.

In an example embodiment, the wearable computing device may access a user-interface profile. The user-interface profile may, for example, be stored on the device or accessed remotely. This user-interface profile may include a plurality of user-interface settings for a plurality of user activities, in which each user-interface setting is customized for a specific user activity. Selecting a user interface for the wearable computing device such that the user interface is appropriate for the determined user activity may then include selecting from the user-interface profile at least one user-interface setting that is customized for the determined user activity. A user-interface profile could include information relating to a single user or to a plurality of users. For example, in the case that four users (user 1 through user 4) are authorized to use the wearable computing device, the user-interface profile may include information for all four users. In this regard, FIG. 6 depicts an example user-interface profile 600 for wearable computing device, in which the user-interface profile 600 includes profile information for four users.

In an example, a user may customize the user's settings for each user activity. In another example, the wearable computing device may have default settings for a given user activity. For instance, in profile 600, user 1 and user 2 each have customized user profiles for a variety of user activities. In particular, user 1 is associated with customized walking profile 610, customized running profile 612, customized traveling-upstairs profile 614, and customized traveling-downstairs profile 616. Similarly, user 2 is associated with customized walking profile 620, customized running profile 622, customized traveling-upstairs profile 624, and customized traveling-downstairs profile 626. However, users 3 and 4 are associated with default walking profile 630, default running profile 632, default traveling-upstairs profile 634, and default traveling-downstairs profile 636.

In an example embodiment, the wearable computing device may be configured to prevent unauthorized use of the wearable computing device. For instance, in the example of FIG. 6, users 1-4 may be the only authorized users of the wearable computing device. The accelerometer system may be configured to identify whether a user wearing the wearable computing device is authorized to use the device. The wearable computing device may store movement data for each authorized user of the device. In order to store movement data for each authorized user, the wearable computing device may perform a user setup. During the user setup, the wearable computing device could request the user to perform various activities for a given period of time (e.g., walk for 30 second, run for 30 seconds, etc.). The wearable computing device could then record the data and store it in a profile for the user. When users other than users 1-4 attempt to use the wearable computing device, the wearable computing device could lock out the unauthorized users.

Each user may have a specific movement pattern that enables the wearable computing device to identify the particular user wearing the wearable computing device based on the accelerometer data. In order to determine a particular user wearing the wearable computing device, the on-board computing system 118 may perform calculations suitable for a pattern-recognition problem, such as a nearest-neighbor-model algorithm or an HMM algorithm. If the user is identified as an authorized user (i.e., user 1-4), the wearable computing device may allow the user to use the device, and the device may adjust the user interface according to user-interface profile 600 when different user activities are detected. However, if the user is not identified as an authorized user, the device could automatically lock, preventing the unauthorized user from using the device.

In addition to the user activities described above, it should be understood that the wearable computing device may be configured to detect other user activities. For example, the accelerometer system may be configured to detect whether a user is driving in a car or traveling on a train. The wearable computing device may then select a user interface that is appropriate for those user activities. For instance, if the wearable computing device determines that a user is traveling in a car, the computing device could automatically turn on the wearable computing device's blue-tooth capability, so that the wearable computing device could automatically connect to wireless communication devices in the user's car.

As another example, the accelerometer may be configured to detect the location of a user based on the accelerometer data and/or other data. For instance, the wearable computing device would determine a user's location based on dead-reckoning principles. For example, a user may typically travel in the same manner and direction when a user is traveling to work. The accelerometer system may detect this typical movement pattern, and may thus detect when a user is traveling to work. When the user arrives at work, the wearable computing device may select a user customized work user interface. Similarly, the wearable computing device may be able to detect when a user travels home from work, and when the user reaches home, the wearable computing device may change the user interface to a user customized home user interface.

IV. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It should be understood that for situations in which the systems and methods discussed herein collect and/or use any personal information about users or information that might relate to personal information of users, the users may be provided with an opportunity to opt in/out of programs or features that involve such personal information (e.g., information about a user's preferences). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    an accelerometer system determining a user activity of a user wearing a wearable computing device;
    based on the user activity determined by the accelerometer system, selecting a user interface for the wearable computing device such that the user interface is appropriate for the determined user activity;
    wherein, if the user activity comprises traveling upstairs, the selected user interface comprises a display interface area where the display interface area is, compared to a standard display interface area, shifted towards a top of a display screen of the wearable computing device; and wherein, if the user activity comprises traveling downstairs, the selected user interface comprises a display interface area where the display interface area is, compared to a standard display interface area, shifted towards a bottom of a display screen of the wearable computing device.

2. The method of claim 1, wherein the determined user activity is selected from the group consisting of standing, sitting, walking, running, traveling upstairs, and traveling downstairs.

3. The method of claim 1, wherein the user interface comprises at least one of a visual user-interface setting appropriate for the determined user activity and an audio user-interface setting appropriate for the determined user activity.

4. The method of claim 1, wherein the user activity comprises running, and wherein the user interface comprises a display of running-related statistics of the user.

5. The method of claim 2, wherein the user activity comprises running, and wherein the user interface comprises a display with a visual density that is appropriate for running.

6. The method of claim 5, wherein the visual density that is appropriate for running comprises a visual density that is less dense that a visual density that is appropriate for walking or sitting.

7. The method of claim 1, further comprising:
the wearable computing device storing a user-interface profile, wherein the user-interface profile comprises a plurality of user-interface settings for a plurality of user activities, in which each user-interface setting is customized for a specific user activity; and
wherein selecting a user interface for the wearable computing device such that the user interface is appropriate for the determined user activity comprises selecting from the user-interface profile at least one user-interface setting that is customized for the determined user activity.

8. The method of claim 1, further comprising:
the accelerometer system detecting a change in the user activity of the user from the determined user activity to a second user activity different from the determined user activity; and
responsive to detecting the change in the user activity of the user, selecting a second user interface based on the second user activity such that the second user interface is appropriate for the second user activity.

9. The method of claim 1, wherein the accelerometer system comprises an accelerometer.

10. The method of claim 9, wherein the accelerometer system further comprises at least one of a gyroscope and compass.

11. The method of claim 1, wherein the accelerometer system is part of the wearable computing device.

12. The method of claim 1, wherein the accelerometer system is mounted on the user separate from the wearable computing device.

13. A non-transitory computer readable medium having instructions stored thereon that, in response to execution by a processor, cause the processor to perform operations, the instructions comprising:
instructions for determining a user activity of a user wearing a wearable computing device;
instructions for, based on the determined user activity, selecting a user interface for the wearable computing device such that the user interface is appropriate for the determined user activity;
wherein, if the user activity comprises traveling upstairs, the selected user interface comprises a display interface area where the display interface area is, compared to a standard display interface area, shifted towards a top of a display screen of the wearable computing device; and
wherein, if the user activity comprises traveling downstairs, the selected user interface comprises a display interface area where the display interface area is, compared to a standard display interface area, shifted towards a bottom of a display screen of the wearable computing device.

14. The non-transitory computer readable medium of claim 13, wherein the instructions further comprise:
instructions for detecting a change in the user activity of the user from the determined user activity to a second user activity; and
instructions for, responsive to detecting the change in the user activity of the user, selecting a second user interface based on the second user activity such that the second user interface is appropriate for the determined second user activity.

15. The non-transitory computer readable medium of claim 13, wherein the determined user activity is selected from the group consisting of sitting, walking, running, traveling upstairs, and traveling downstairs.

16. A wearable computing system comprising:
a head-mounted display, wherein the head-mounted display is configured to display computer-generated information in accordance with a user interface and to allow visual perception of the physical world;
an accelerometer system configured to determine a user activity of a user wearing the head-mounted display; and
a controller, wherein the controller is configured to, based on the user activity determined by the accelerometer system, select the user interface for the head-mounted display such that the selected user interface is appropriate for the determined user activity;
wherein, if the user activity comprises traveling upstairs, the selected user interface comprises a display interface area where the display interface area is, compared to a standard display interface area, shifted towards a top of a display screen of the head mounted display; and
wherein, if the user activity comprises traveling downstairs, the selected user interface comprises a display interface area where the display interface area is, compared to a standard display interface area, shifted towards a bottom of a display screen of the head mounted display.

17. The wearable computing system of claim 16, wherein the determined user activity is selected from the group consisting of sitting, walking, running, traveling upstairs, and traveling downstairs.

18. The wearable computing system of claim 16, wherein the accelerometer system is in the head-mounted display.

19. The wearable computing system of claim 16, wherein the accelerometer system is mounted on the user separate from the head-mounted display.

20. The wearable computing system of claim 16, wherein the accelerometer system comprises at least one of a gyroscope and compass.

21. A method comprising:
an accelerometer system determining a user activity of a user wearing a wearable computing device;
based on the user activity determined by the accelerometer system, selecting a user interface for the wearable computing device such that the user interface is appropriate for the determined user activity;
wherein, if the user activity comprises elevating at an angle, the selected user interface comprises a display interface area where the display interface area is, compared to a standard display interface area, shifted towards a top of a display screen of the wearable computing device; and wherein, if the user activity comprises descending at an angle, the selected user interface comprises a display interface area where the display interface area is, compared to a standard display interface area, shifted towards a bottom of a display screen of the wearable computing device.

22. The method of claim 21, wherein the determined user activity is selected from the group consisting of standing, sitting, walking, running, traveling upstairs, traveling downstairs, traveling uphill, and traveling downhill.

23. The method of claim 21, wherein the user interface comprises at least one of a visual user-interface setting appropriate for the determined user activity and an audio user-interface setting appropriate for the determined user activity.

24. The method of claim 21, wherein the user activity comprises running, and wherein the user interface comprises a display of running-related statistics of the user.

25. The method of claim 22, wherein the user activity comprises running, and wherein the user interface comprises a display with a visual density that is appropriate for running.

26. The method of claim 25, wherein the visual density that is appropriate for running comprises a visual density that is less dense that a visual density that is appropriate for walking or sitting.

27. The method of claim 21, further comprising:
the wearable computing device storing a user-interface profile, wherein the user-interface profile comprises a plurality of user-interface settings for a plurality of user activities, in which each user-interface setting is customized for a specific user activity; and
wherein selecting a user interface for the wearable computing device such that the user interface is appropriate for the determined user activity comprises selecting from the user-interface profile at least one user-interface setting that is customized for the determined user activity.

28. The method of claim 21, further comprising:
the accelerometer system detecting a change in the user activity of the user from the determined user activity to a second user activity different from the determined user activity; and
responsive to detecting the change in the user activity of the user, selecting a second user interface based on the second user activity such that the second user interface is appropriate for the second user activity.

29. The method of claim 21, wherein the accelerometer system comprises an accelerometer.

30. The method of claim 29, wherein the accelerometer system further comprises at least one of a gyroscope and compass.

31. The method of claim 21, wherein the accelerometer system is part of the wearable computing device.

32. The method of claim 21, wherein the accelerometer system is mounted on the user separate from the wearable computing device.

33. The method of claim 21, wherein elevating at an angle comprises elevating at an angle between 10 and 80 degrees, and wherein descending at an angle comprises descending at an angle between 10 and 80 degrees.

34. A non-transitory computer readable medium having instructions stored thereon that, in response to execution by a processor, cause the processor to perform operations, the instructions comprising:

instructions for determining a user activity of a user wearing a wearable computing device;
instructions for, based on the determined user activity, selecting a user interface for the wearable computing device such that the user interface is appropriate for the determined user activity;
wherein, if the user activity comprises elevating at an angle, the selected user interface comprises a display interface area where the display interface area is, compared to a standard display interface area, shifted towards a top of a display screen of the wearable computing device; and
wherein, if the user activity comprises descending at an angle, the selected user interface comprises a display interface area where the display interface area is, compared to a standard display interface area, shifted towards a bottom of a display screen of the wearable computing device.

35. The non-transitory computer readable medium of claim 34, wherein the instructions further comprise:
instructions for detecting a change in the user activity of the user from the determined user activity to a second user activity; and
instructions for, responsive to detecting the change in the user activity of the user, selecting a second user interface based on the second user activity such that the second user interface is appropriate for the determined second user activity.

36. The non-transitory computer readable medium of claim 34, wherein the determined user activity is selected from the group consisting of sitting, walking, running, traveling upstairs, traveling downstairs, traveling uphill, and traveling downhill.

37. The non-transitory computer readable medium of claim 34, wherein elevating at an angle comprises elevating at an angle between 10 and 80 degrees, and wherein descending at an angle comprises descending at an angle between 10 and 80 degrees.

38. A wearable computing system comprising:
a head-mounted display, wherein the head-mounted display is configured to display computer-generated information in accordance with a user interface and to allow visual perception of the physical world;
an accelerometer system configured to determine a user activity of a user wearing the head-mounted display; and
a controller, wherein the controller is configured to, based on the user activity determined by the accelerometer system, select the user interface for the head-mounted display such that the selected user interface is appropriate for the determined user activity;
wherein, if the user activity comprises elevating at an angle, the selected user interface comprises a display interface area where the display interface area is, compared to a standard display interface area, shifted towards a top of a display screen of the head mounted display; and
wherein, if the user activity comprises descending at an angle, the selected user interface comprises a display interface area where the display interface area is, compared to a standard display interface area, shifted towards a bottom of a display screen of the head mounted display.

39. The wearable computing system of claim 38, wherein the determined user activity is selected from the group consisting of sitting, walking, running, traveling upstairs, traveling downstairs, traveling uphill, and traveling downhill.

40. The wearable computing system of claim 38, wherein the accelerometer system is in the head-mounted display.

41. The wearable computing system of claim 38, wherein the accelerometer system is mounted on the user separate from the head-mounted display.

42. The wearable computing system of claim 38, wherein the accelerometer system comprises at least one of a gyroscope and compass.

* * * * *